(12) United States Patent
Maitra et al.

(10) Patent No.: US 12,164,292 B2
(45) Date of Patent: Dec. 10, 2024

(54) MACHINE LEARNING DESIGN FOR LONG-TERM RELIABILITY AND STRESS TESTING

(71) Applicant: MICROSOFT TECHNOLOGY LICENSING, LLC, Redmond, WA (US)

(72) Inventors: Kingsuk Maitra, Fremont, CA (US); Edilmo Daniel Palencia, Santa Clara, CA (US); Garrett Patrick Prendiville, Sallins (IE); Kence Anderson, Berkeley, CA (US); Kinshumann Kinshumann, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 218 days.

(21) Appl. No.: 17/838,074

(22) Filed: Jun. 10, 2022

(65) Prior Publication Data
US 2023/0297096 A1 Sep. 21, 2023

Related U.S. Application Data

(60) Provisional application No. 63/321,482, filed on Mar. 18, 2022.

(51) Int. Cl.
*G05B 23/02* (2006.01)
*G05B 13/02* (2006.01)
(Continued)

(52) U.S. Cl.
CPC ....... *G05B 23/0254* (2013.01); *G05B 13/028* (2013.01); *G06F 11/008* (2013.01); *G06N 3/006* (2013.01)

(58) Field of Classification Search
CPC .............. G05B 23/0254; G05B 13/028; G05B 13/0265; G05B 23/0256; G05B 2219/2614; G05B 19/042; G06F 11/008; G06N 3/006
See application file for complete search history.

(56) References Cited

U.S. PATENT DOCUMENTS

2006/0129892 A1* 6/2006 Diaconu ............. G06F 11/3672
714/38.14
2019/0303759 A1 10/2019 Farabet et al.
(Continued)

FOREIGN PATENT DOCUMENTS

CN 110399658 B * 1/2021 ............. G06F 30/20
KR 101925480 B1 * 11/2017 ............. G06F 17/50

OTHER PUBLICATIONS

Qin et al, "Non-Arrhenius Temperature Acceleration and Stress-Dependent Voltage Acceleration for Semiconductor Device Involving Multiple Failure Mechanisms", 2006, pp. 93-97, downloaded from https://ieeexplore.ieee.org/stamp/stamp.jsp?tp=&arnumber=4098696 (Year: 2006).*
Escobar et al, "A Review of Accelerated Test Models", 2007, pp. 1-27, downloaded from https://www.researchgate.net/publication/1758658_A_Review_of_Accelerated_Test_Models (Year: 2006).*
(Continued)

*Primary Examiner* — Darrin D Dunn
*Assistant Examiner* — Olvin Lopez Alvarez
(74) *Attorney, Agent, or Firm* — Newport IP, LLC; Jacob P. Rohwer (57) ABSTRACT

The techniques disclosed herein enable systems to measure the long-term reliability of machine learning agents prior to deployment at a control system. This is achieved through analysis of control system component specifications to determine a useful lifespan of the components such as projected failure rate, hours continuous operation, and so
(Continued)

forth. The system can derive parameters for the machine learning agent to interact with the components such as action frequency and action range. From the component lifespan, action frequency, and action range, an accelerated test procedure is constructed to evaluate the reliability of the machine learning agent. From executing the accelerated test procedure, a reliability score can be calculated for the machine learning agent.

20 Claims, 7 Drawing Sheets

(51) Int. Cl.
*G06F 11/00* (2006.01)
*G06N 3/006* (2023.01)

(56) References Cited

U.S. PATENT DOCUMENTS

| | | |
|---|---|---|
| 2019/0378020 A1 | 12/2019 | Camilus et al. |
| 2020/0302100 A1* | 9/2020 | Teplinsky ............... G06N 20/00 |
| 2021/0109830 A1* | 4/2021 | Venugopal ............... H04L 67/10 |
| 2021/0191342 A1 | 6/2021 | Lee et al. |
| 2021/0263839 A1* | 8/2021 | Kim .................. G06F 18/24133 |
| 2021/0303998 A1 | 9/2021 | Manoharan et al. |

OTHER PUBLICATIONS

Riccio et al, "Testing machine learning based systems: a systematic mapping" 2020, pp. 5193-5254, downloaded from chrome-extension:// efaidnbmnnnibpcajpcglclefindmkaj/https://link.springer.com/content/ pdf/10.1007/s10664-020-09881-0.pdf (Year: 2020).*
Ma et al, "DeepGauge: Multi-Granularity Testing Criteria for Deep Learning Systems", 2018, pp. 120-131, downloaded from https:// arxiv.org/abs/1803.07519 (Year: 2018).*
Moghadam et al (Poster: Performance Testing Driven by Reinforcement Learning), 2020, pp. 402-405, downloaded from https:// ieeexplore.ieee.org/document/9159096 (Year: 2020).*
Pancholi, "The Importance of Product Burn-In Test", 2021, pp. 6, downloaded from https://semiengineering.com/the-importance-of-product-burn-in-test/ (Year: 2021).*
Pawar et al, "Distributed Deep Reinforcement Learning for Simulation Control", 2020, pp. 17 downloaded from https://arxiv.org/ abs/2009.10306 (Year: 2020).*
Chan et al, "Measuringthe Reliabilityof Reinforcementlearningalgorithms", 2020, pp. 1-36, downloaded from chrome-extension://efaidnbmnnnibpcajpcglclefindmkaj/https:// openreview.net/pdf?id=SJIpYJBKvH (Year: 2020).*
"International Search Report and Written Opinion Issued in PCT Application No. PCT/US23/012868", Mailed Date: May 30, 2023, 12 Pages.
Wilkins, Dennis J., "The Bathtub Curve and Product Failure Behavior Part Two—Normal Life and Wear-Out", In Magazine of Reliability HotWire, Issue 22, Dec. 2002, 4 Pages.

* cited by examiner

MACHINE LEARNING DESIGN FOR LONG-TERM RELIABILITY AND STRESS TESTING

PRIORITY APPLICATION

The present application is a non-provisional application of, and claims priority to, U.S. Provisional Application Ser. No. 63/321,482 filed on Mar. 18, 2022, entitled: MACHINE LEARNING DESIGN FOR LONG-TERM RELIABILITY AND STRESS TESTING, the contents of which are hereby incorporated by reference in their entirety.

BACKGROUND

As the scale and complexity of control systems has increased, various organizations have sought improvements in the field of autonomous platforms and autonomous control systems. In many examples, autonomous control systems relate to the control of machinery that is involved in a process such as chemical processing, semiconductor fabrication, and climate control. Autonomous control systems can also be applied to the context of computing platforms such as a datacenter that provides cloud computing services. Thanks to advances in autonomous control systems, many such processes in manufacturing, computing, and many other disciplines can realize benefits in product throughput, efficiency, and other aspects. This is largely the result of reduced reliance on human oversight which can be inconsistent and prone to mistakes.

In recent times, many control systems have been further enhanced with advanced computing techniques such as machine learning and artificial intelligence. These approaches enable systems to not only maintain consistent throughput but even improve over time. In a specific example, an autonomous control system can be augmented by reinforcement learning, commonly referred to as an RL brain or an RL agent. The reinforcement learning agent can accordingly be configured with an objective or goal which is typically to optimize some aspect of the process. For instance, an operator of a manufacturing line may configure the reinforcement learning model to maximize product throughput. The reinforcement learning agent can then modify various aspects of the manufacturing process such as the flow rate of raw materials or batch sizes. In doing so, the reinforcement learning model can iteratively learn a realistically optimal configuration of the manufacturing line to achieve the specified goal (e.g., maximum throughput). In contrast to an autonomous process control system, these systems can be referred to as autonomous platforms as the system can be enabled to independently make decisions and adjust in real time.

However, while operators may realize significant improvements in efficiency or throughput through advanced computing techniques, many existing machine learning solutions for autonomous control systems can fail to account for some critical factors. For example, a machine learning agent may be deployed to handle energy management of a datacenter. As component of the overall datacenter system, deployment of the machine learning agent can be highly risky as new components tend to experience a period of burn-in where failure rate is high thereby requiring frequent fixes. However, in sensitive applications such as a datacenter power management a failure of the machine learning agent can prove catastrophic to normal operations. In another example, a machine learning agent can be deployed to control a manufacturing line. In this context, any disruption to operations can lead to massive losses in product throughput and revenue.

While machine learning agents are oftentimes trained and validated prior to deployment in a live context, there is typically no mechanism for ensuring long-term reliability for the specific deployment. For example, while a machine learning agent may be trained using data from a manufacturing line, the long-term performance of the machine learning agent in a real-life manufacturing line can be uncertain. At a subsequent point in time, the machine learning agent may fail due to unforeseen changes in various operating conditions of the manufacturing line. Thus, there is a need for methods to ensure reliability of machine learning agents in autonomous control systems prior to deployment to reduce the likelihood of high severity failures.

It is with respect to these and other considerations that the disclosure made herein is presented.

SUMMARY

The techniques disclosed herein improve the functionality of control system through the introduction of an accelerated testing process for machine learning agents. Generally described, a control system in the context of the present disclosure can comprise one or more physical components that are controlled by a machine learning agent. In a specific example, a control system can be a climate control system for a building that comprises various HVAC devices such as chillers which are managed by the machine learning agent. To test the long-term reliability of the machine learning agent within a control system, the disclosed system can be configured to construct an accelerated test for the machine learning agent based on the particular characteristics of the control system.

In various examples, the data defining various product specifications can be extracted from the control system. For instance, the product specifications can characterize the useful lifespan of an associated component of the control system. In a specific example, a product specification can specify a number of power-on hours and power-on cycles for a given component. In addition, a product specification can also define a failure rate as a mathematical function, statistical model, or other suitable format. In some examples, a product specification can be extracted for some or all components of a control system.

By analyzing the product specifications, the disclosed system can determine various phases of the useful life for each control system component. As will be discussed below, the useful life of a component can be expressed using various phases that express a potential failure rate of the component. For example, a nominal phase may define time period in which the component experiences a consistent and typically minimal failure rate. In contrast, an aging phase can define a time period in which the component experiences a failure rate that increases over time. At this point in time, the component may be considered to have passed its useful life. This analysis can similarly be performed for some or all of the control system components.

To construct an effective accelerated test, the disclosed system can derive additional information regarding the control system components. In one example, the system can calculate an action frequency for a component based on the associated nominal phase. In various examples, the action frequency can define how often the machine learning agent can actuate a particular component as constrained by some physical characteristics.

Similarly, an action range can be derived for each component using an acceleration factor for a stress parameter of the component such as temperature, voltage, and the like. For example, an electrical component may have a voltage stress parameter. Accordingly, the system can derive an acceleration factor for the electrical component to enable simulated failure when testing the machine learning agent. As with other component analyses, action frequencies and action ranges can be derived for any components under the management of the machine learning agent.

Using the information gathered from the control system components such as nominal phases, aging phases, action frequencies, and action ranges, the disclosed system can construct an accelerated test for the machine learning agent. The accelerated test can also be referred to as a reliability test or a stress test. Thanks to the extensive data collection and analysis mentioned above, the resulting accelerated test can accurately simulate the behaviors of the control system as well as modify those behaviors. In this way the disclosed system can place the machine learning agent in a wide variety of scenarios to observe reliability, operational limits, useful life, and other vital characteristics of the machine learning agent.

When executing the accelerated test, the disclosed system can calculate various measures of reliability for the machine learning agent. For example, a numerical score can be assigned to quantify the reliability of the machine learning agent. In addition, the system can calculate a probability of failure for a given time period and other metrics to express the useful life of the machine learning agent.

By performing these extensive tests on a machine learning agent prior to deployment, operators can minimize the risk associated with introducing a machine learning agent to an automated control system. In this way, disruptions to normal operations can be reduced and even eliminated. In contrast to traditional methods that cannot guarantee long-term reliability, the accelerated testing enabled by the disclosed techniques can ensure reliable and consistent performance of control systems. In addition, by gaining insight into the long-term behaviors of the machine learning agent and the control system, operators can provide concrete performance guarantees to users as well as a well-defined schedule for maintenance and retraining of the machine learning agent.

In another example of the technical benefit of the present disclosure, the techniques discussed herein can enable a control system to preemptively address potential failures through the accelerated test techniques mentioned above. By analyzing the long-term behaviors of control system components as well as the machine learning agent itself, the disclosed system can accurately calculate failure probabilities for control system components and the machine learning agent over time. For instance, based on the accelerated test, the system may predict a component failure prior to it actually occurring. Accordingly, the system can alert a user to the potential failure and prevent costly downtime and maintenance.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for enhancing the operation of autonomous control systems through the introduction of accelerated testing to measure the long-term reliability of machine learning agents. As mentioned above, a set of product specifications can be extracted from a corresponding set of components within a control system. In some examples, a product specification can define various durability metrics for an associated component such as a number of hours the component can be expected to operate continuously. From analyzing the product specifications, the disclosed system can determine a useful lifespan for the component. The useful lifespan can include various phases such as a nominal phase which can define a time period where the component operates as expected with a consistent and/or minimal failure rate. In addition, the useful lifespan can include an aging phase which can define a time period where the component experiences an increasing failure thus nearing the end of its useful life.

From the useful lifespan, the system can accordingly derive an action frequency and/or an action range for each component which define how the machine learning agent can interact with a particular component. As will be discussed further below, some physical limitations of the components constrain ways in which the machine learning agent can manage the control system components. Using the detailed component information, the system can accurately simulate the control system components and construct an accelerated test to evaluate the long-term reliability of the machine learning agent.

The disclosed system addresses several technical challenges associated with enhancing autonomous platforms with advanced techniques such as machine learning. For example, many existing solutions do not consider long-term reliability in machine learning design. As such, the behavior of machine learning agents at long time scales such as years or even decades can be uncertain. In addition, many existing approaches do not perform stress testing on machine learning agents prior to deployment. As such, when encountering unanticipated control system conditions such as an abnormally high voltage, the machine learning agent may exhibit unexpected behavior or fail entirely. In contrast, by performing the accelerated testing described herein, the disclosed system can enable control system operators to gain well-defined insight on the behavior a machine learning agent prior to deployment. This is especially critical in sensitive applications such as a manufacturing line or climate control system where a failure of the machine learning model can prove catastrophic to normal operations.

Various examples, scenarios, and aspects that enable quality aware machine learning in autonomous platforms, are described below with reference to FIGS. 1-5.

Figure 1:
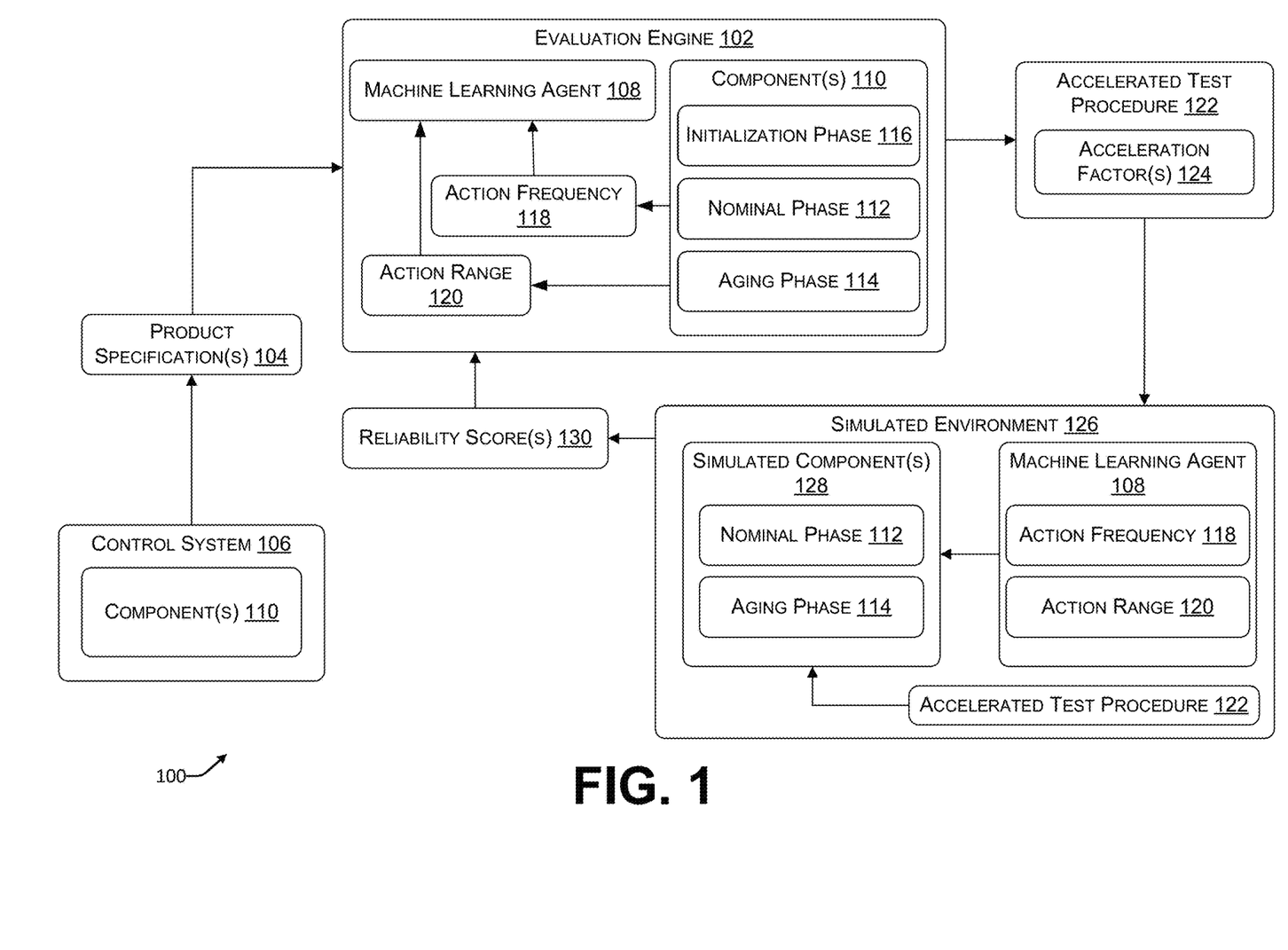
FIG. 1 is a block diagram of a system for performing accelerated testing to measure long-term reliability of machine learning agents.

FIG. 1 illustrates an example environment 100 in which an evaluation engine 102 extracts a set of product specifications 104 from a control system 106 to evaluate a machine learning agent 108. As mentioned above, the product specifications 104 can define various durability metrics for the control system components. For instance, a product specification 104 can define a number of power-on hours of a particular component 110. In another instance, the product specification 104 can define a number of power-on cycles for the component 110. In a specific example, a component 110 may be a battery which can have various associated product specifications 104 such as a power-on rating of ten thousand hours and a power-on rating of two thousand cycles. Stated another way, the battery may be continuously operational for ten thousand hours and fully charged and discharged (e.g., cycled) two thousand times during those ten thousand hours. In various examples, the evaluation engine 102 can extract the product specifications 104 for some or all of the components 108 within the control system 106. In an alternative example, a machine learning agent 108 may only control some of the components 110 of the control system 106. Accordingly, the evaluation engine 102 may only extract product specifications 104 for components 110 which are directly controlled by the machine learning agent 110. It should be understood that the evaluation engine 102 can be implemented using any suitable approach such as automated analysis through a machine learning agent 108.

By analyzing the product specifications 104, the evaluation engine 102 can determine a nominal phase 112 and an aging phase 114 for each component 110 for which product specifications 104 was extracted. As mentioned briefly above, the lifespan of a component 110 can be expressed through various phases that capture a probability that the component will fail within a predetermined time period. For instance, a new component 110 may experience an initialization phase 116 where failure rate is high and progressively decreases as the component "burns in." The initialization phase 116 can be followed by a nominal phase 112 where failure rate is consistent and/or minimal as the component performs normal operations. At a later point, the component 110 can enter an aging phase 114 where failure rate increases over time as the component 110 wears out and thus reaches the end of its lifespan.

In some contexts, the nominal phase 112 and the aging phase 114 of a component 110 are of particular interest for testing and configuring the machine learning agent 108 as various components 110 can be integrated and initialized through other methods before coming under control of the machine learning agent 108. For example, the control system 106 may be for a manufacturing line. In this context, a new component 110 is installed and integrated manually by technicians and/or engineers who closely monitor and address failures during the initialization phase 116. When the component 110 is fully operational, the component 110 is subsequently placed under control of the machine learning agent 108.

Based on the nominal phase 112, the evaluation engine can calculate an action frequency 118 that dictates the rate at which the machine learning agent 108 can actuate an associated component 110. As mentioned above, some physical characteristics of a component 110 can constrain the action frequency 118. For instance, frequent power cycling of a chiller in a climate control system can lead to increased strain and thus degradation. To calculate a maximum action frequency 118, the evaluation engine 102 can project a power cycle frequency using the product specifications 104. As discussed above, the product specifications 104 for a component 110 can define the rated number of power-on cycles and the rated number of power-on hours for the component 110. In a specific example, the component 110 is a chiller and may be rated by its product specification 104 for twenty thousand power-on hours and three thousand power-on cycles. Based on these metrics, the evaluation engine and/or the machine learning model can calculate the maximum action frequency 118 by dividing the power-on cycles by the power-on hours. In addition, the evaluation engine and/or the machine learning model can calculate a minimum action frequency 118. In the example of the chiller, the minimum action frequency 118 can be determined by the thermal mass handled by the chiller. Intuitively, modifying the chiller setpoint too frequently can prevent the chiller from actually cooling the given thermal mass. In another example, the lower bound of the action frequency can be calculated based on the capacitive load of an electrical device.

Using the maximum and minimum action frequency 118, the evaluation engine 102 and/or the machine learning agent 108 can iteratively discover a realistically optimal action frequency 118. For example, the machine learning agent 108 can determine that, given the thermal mass handled by a chiller, the power-on hours, and power-on cycles defined by the product specifications 104, an action frequency 118 of eight hours leads to the best efficiency. This can be achieved through several iterations of an action that is applied to a component 110. It should be understood that this calculation can take place for any component 110 using appropriate parameters.

In addition to action frequency 118, consideration must also be given to an action range 120 when performing accelerated testing of the machine learning agent 108. In various examples, an action range 120 can define the range of possible values the machine learning agent 108 can modify at a component 110 using an action. For example, a chiller in a climate control system may support a setpoint between zero degrees Fahrenheit and seventy degrees Fahrenheit. During normal operations, the action range 120 for the chiller can accordingly be set to that temperature range. In this situation, the chiller has a stress parameter of temperature constrains the action range 120. However, to construct an accelerated test procedure 122 also known as a stress test, the action range 120 can be modified to include an acceleration factor based on the stress parameter of the component. In this way, the disclosed system can test the machine learning agent in conditions that are far beyond typical to observe the limits of the machine learning agent 108.

Furthermore, the disclosed system can be configured to construct a simulated environment 126 for executing the accelerated test procedure 122. In various examples, the simulated environment 126 is configured with simulated components 128 having the nominal phase 112 and the aging phase 114 derived from the product specifications 104. In this way, the simulated environment 126 can closely mimic the components 110 of the control system 106. Consequently, the simulated environment 126 allows the evaluation engine 102 to accurately assess the performance of the machine learning agent 108 for the specific context of a particular control system 106. As such, a user of the machine learning agent 108 can gain insight into a failure probability of the machine learning agent 108 over time and minimize risk associated with deploying the machine learning agent 108.

Following execution of the accelerated test procedure 122, the evaluation engine 102 can be configured to calculate a reliability score 130 for the machine learning agent 108. As will be elaborated upon below, the reliability score 130 can be calculated based on the collected results of a plurality of corner tests defined by the accelerated test procedure 122 to capture an overall reliability of the machine learning agent 108. For instance, the reliability score can be calculated based on the failure rate of the machine learning model across the corner tests. In an alternative example, an individual reliability score 130 can be calculated each corner test defined by the accelerated test procedure 122. Furthermore, the simulated environment 126 can be configured to simultaneously evaluate many instances of the machine learning agent 108. As mentioned above, this approach can be used to obtain a statistical failure rate for the machine learning agent 108 over time. In addition, an aggregate of reliability scores can be calculated for the machine learning agent 108 based on the plurality of instances. It should be understood that while the reliability score can be a numerical score, any suitable measure of reliability can be used to express the long-term reliability of the machine learning agent.

Moreover, the reliability score can be provided to the evaluation engine for analysis. In some examples, the evaluation engine can be configured with a threshold reliability score. If the reliability score for a machine learning agent falls below the threshold reliability score, the machine learning agent can be prevented from deployment to the control system. Conversely, if the reliability score meets or exceeds the threshold reliability score, the machine learning agent can be deployed to the control system. Alternatively, the machine learning agent can be presented to an administrative entity for integration into the control system such as a system administrator, engineer, or technician.

Figure 2A:
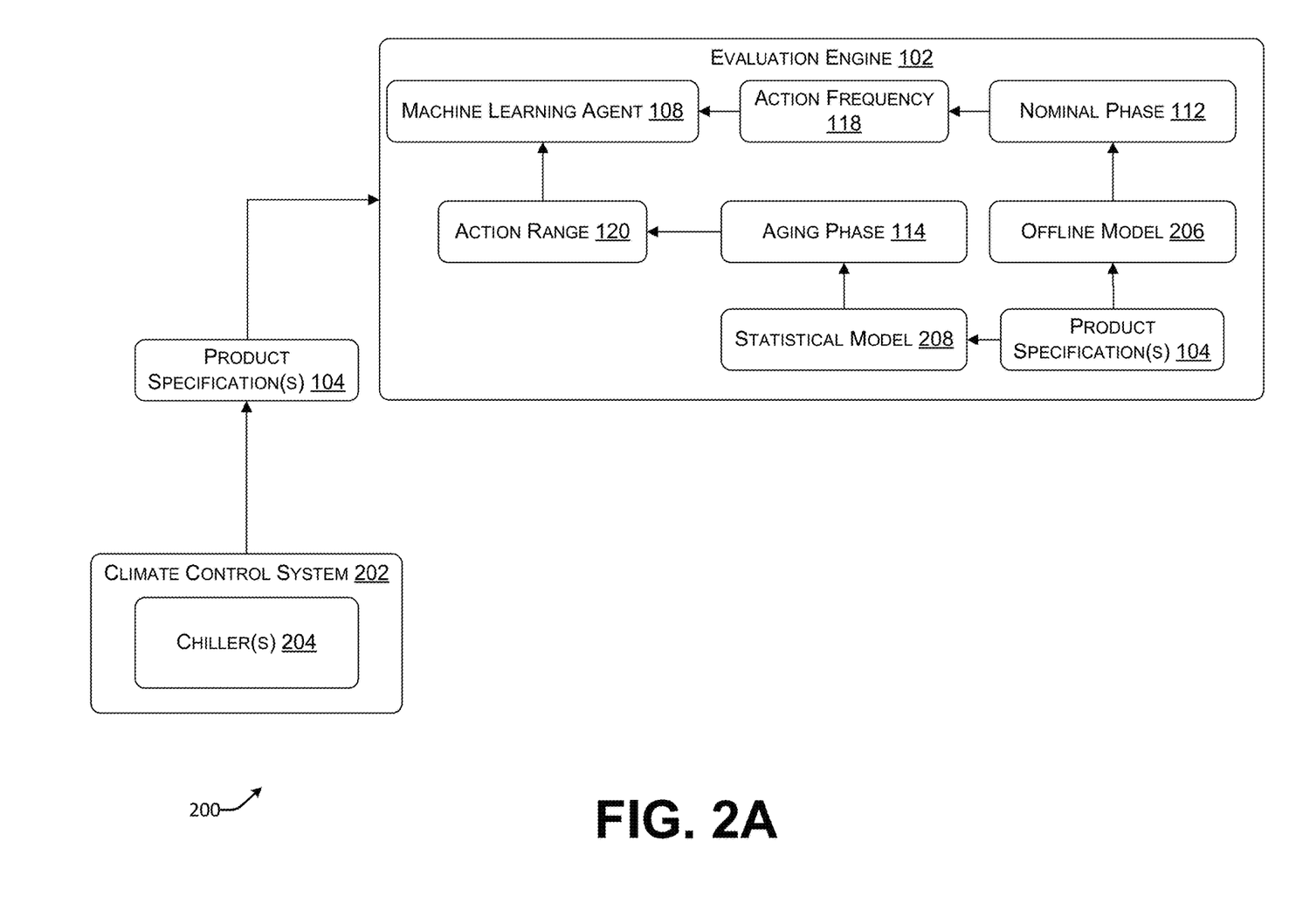
FIG. 2A illustrates the system for performing accelerated testing to measure long-term reliability of machine learning agents in a first stage of operation.

Turning now to FIG. 2A, aspects of a system 200 for evaluating a machine learning agent 108 for managing a climate control system 202 are shown and described. As mentioned above, one context that sees great benefit from autonomous platforms is climate control systems 202 which represent a significant portion of operating costs for large buildings (e.g., corporate offices). In particular, autonomous platforms can realize efficiency improvements by controlling the chillers 204 for a climate control system 202. However, to effectively manage the climate control system 202 and minimize risk, the machine learning agent 108 that will be controlling the chillers 204 must be evaluated prior to deployment at the actual climate control system 202. Accordingly, product specifications 104 for the chillers 204 can be extracted by the evaluation engine 102 for analysis by the evaluation engine 102.

To calculate the nominal phase 112 discussed above, the product specifications 104 can be provided to an offline model 206 that analyzes the product specifications 104 to project a nominal phase 112. In the context of a chiller 204, the product specifications 104 may define the power-on hours and the power-on cycles for the chiller 204. Based on these characteristics, the offline model 206 can calculate the nominal phase 112 which can be expressed as a time period (e.g., years). It should be understood that the offline model 206 can be utilize any suitable method of calculating the nominal phase 112 such as an offline reinforcement learning model.

In addition, to calculate the aging phase 114, a statistical model 208 can be applied to the product specifications 104. In various examples, the product specifications 104 may include a failure probability which can be expressed as a probability distribution such as a Weibull distribution. The failure probability can accordingly be provided to a simulator that is configured with the statistical model 208 to calculate the aging phase 114. As described above, the aging phase is a time period following the nominal phase 112 in which the associated component 110, in this example a chiller 204, experiences an increasing failure rate. Stated another way, the aging phase 114 expresses the end of the useful life of the chiller 204 as the probability of failure increases over time due to wear and tear. As discussed above, the evaluation engine 102 can calculate an action frequency 118 and an action range 120 which can be utilized to configure the machine learning agent 108.

Figure 2B:
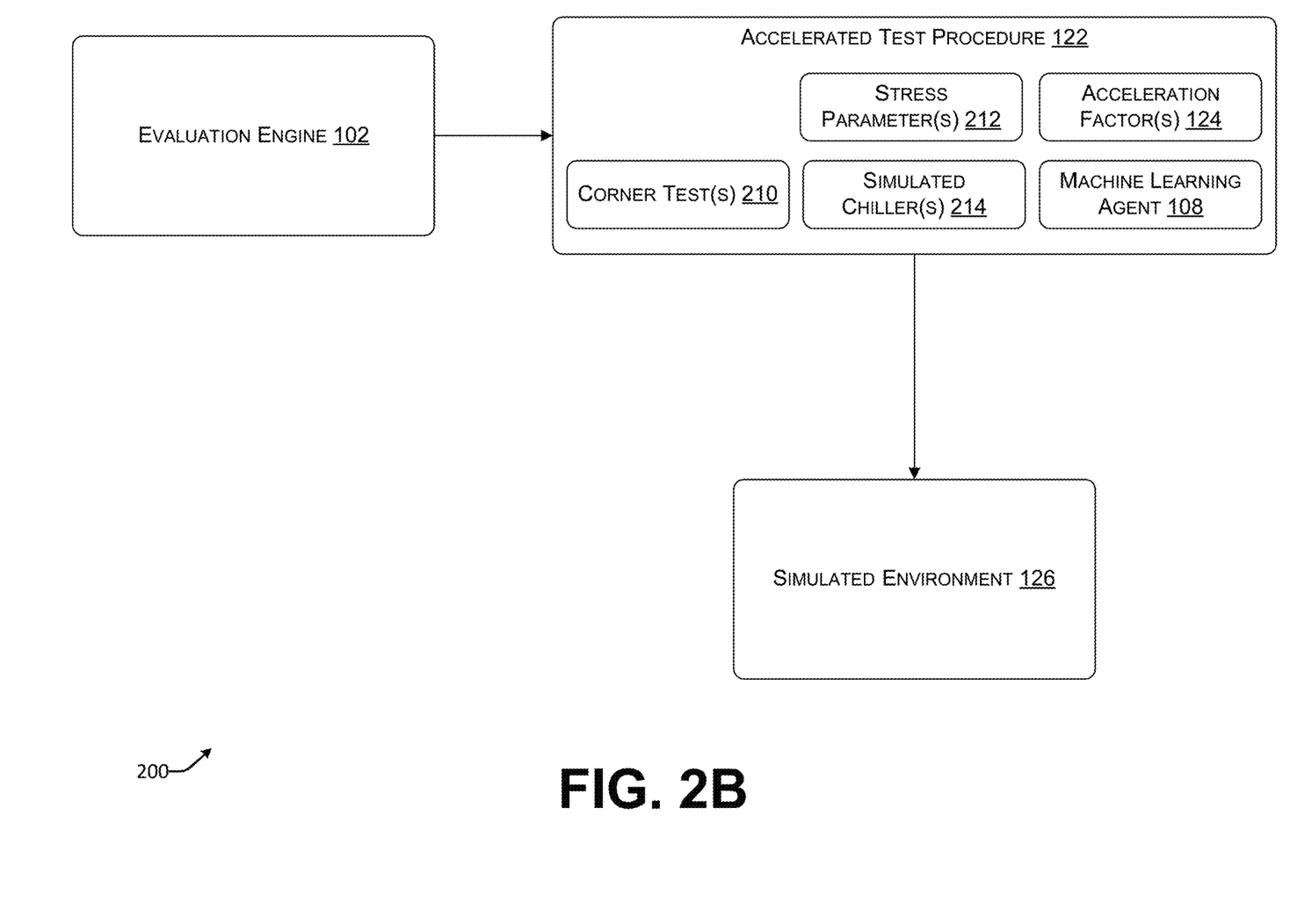
FIG. 2B illustrates the system for performing accelerated testing to measure long-term reliability of machine learning agents in a first stage of operation.

Proceeding to FIG. 2B, the evaluation engine 102 can generate an accelerated test procedure 122 based on the nominal phase 112 and the aging phase 114 as well as the action frequency 118 and the action range 120 that are derived from each respectively. In addition, the accelerated test procedure 122 can include simulated components 128 and the machine learning agent 108 for constructing the simulated environment 126. In this example, the simulated components 128 are simulated chillers 214 that mimic the chillers 204 of the climate control system 202. In addition, the accelerated test procedure 122 can include various corner tests 210 that define a sequence of steps for evaluating the machine learning agent 108 under various load conditions. For example, as mentioned above, the acceleration factors 124 can serve to stress test the machine learning agent 108 beyond normal operating conditions. This enables the evaluation engine 102 to discover the operational limits of the machine learning agent 108 for a given control system 106 such as the climate control system 202. In various examples, the acceleration factors 124 can be determined based a stress parameter 212 for a given component 110. In the present example of the chiller 204, one stress parameter 212 can be temperature. Accordingly, the acceleration factor 124 for temperature can be expressed using the following equation:

$$AF_T = e^{\frac{E_A}{k}\left(\frac{1}{T_0} - \frac{1}{T_S}\right)}$$

Where k is Boltzmann's constant, $T_o$ is the operating temperature in kelvin, $T_S$ is the stress temperature in kelvin, and $E_A$ is the activation energy for a failure mechanism.

Similarly, another acceleration factor can be calculated for a voltage stress parameter 212. This can be expressed using the following equation:

$$AF_V = e^{\beta(V_s - V_o)}$$

Where β is a constant, whose value is derived experimentally such as through circuit simulation, $V_S$ is the stress voltage, and $V_o$ is the operating voltage. The acceleration factor can be applied to the action range 120 to expand the action range 120 outside of typical values. As mentioned this enables stress testing of the machine learning agent 108. For instance, if a nominal action range 120 for temperature is $T(t_1, t_2)$ the action range 120 with the corresponding acceleration factor 124 applied can be expressed as:

$$T(t_1, t_2 + AF_T * t_2)$$

Where $t_1$ is a minimum temperature and $t_2$ is a maximum temperature. It should be understood that acceleration factors 124 can be calculated for any stress parameters such as temperature and voltage discussed above as well as mechanical stress and/or other parameters. In addition, an overall acceleration factor 124 can be calculated to capture all the stress parameters for a component 110. For instance, an electromechanical device such as the chiller 204 may have temperature, voltage, and mechanical stress parameters 212. The overall acceleration factor 124 can be calculated using the following equation:

$$AF_{OA} = AF_V * AF_T * AF_S * \ldots$$

Where $AF_V$ is the voltage acceleration factor 124, $AF_T$ is the temperature acceleration factor 124, and $AF_S$ is the mechanical stress acceleration factor 124. It should be understood that the overall acceleration factor 124 can include any number of acceleration factors 124 that relate to a stress parameter 212 of a component 110. In various examples, weights can additionally be applied to the overall acceleration factor 124 to emphasize or deemphasize individual acceleration factors 124. For instance, if a component is particularly sensitive to changes in temperature while being resilient to changes in voltage, $AF_T$ can receive a greater weighting than $AF_V$.

As mentioned above, the evaluation engine 102 can construct a simulated environment 126 to measure the long-term reliability of the machine learning agent 108. In various examples, the accelerated test procedure 122 can occur prior to deployment of the machine learning agent 108 in a control system 106 such as the climate control system 202. The simulated environment 126 can be configured to execute each of the corner tests 210 defined by the accelerated test procedure 122. For instance, the corner tests can examine three load conditions: a high load, a medium load, and a low load. It should be understood that the accelerated test procedure 122 can define any number of corner tests 210 to evaluate the machine learning agent 108. Indeed, a thorough accelerated test procedure 122 would involve many more corner tests 210 than a simple accelerated test procedure 122.

Figure 2C:
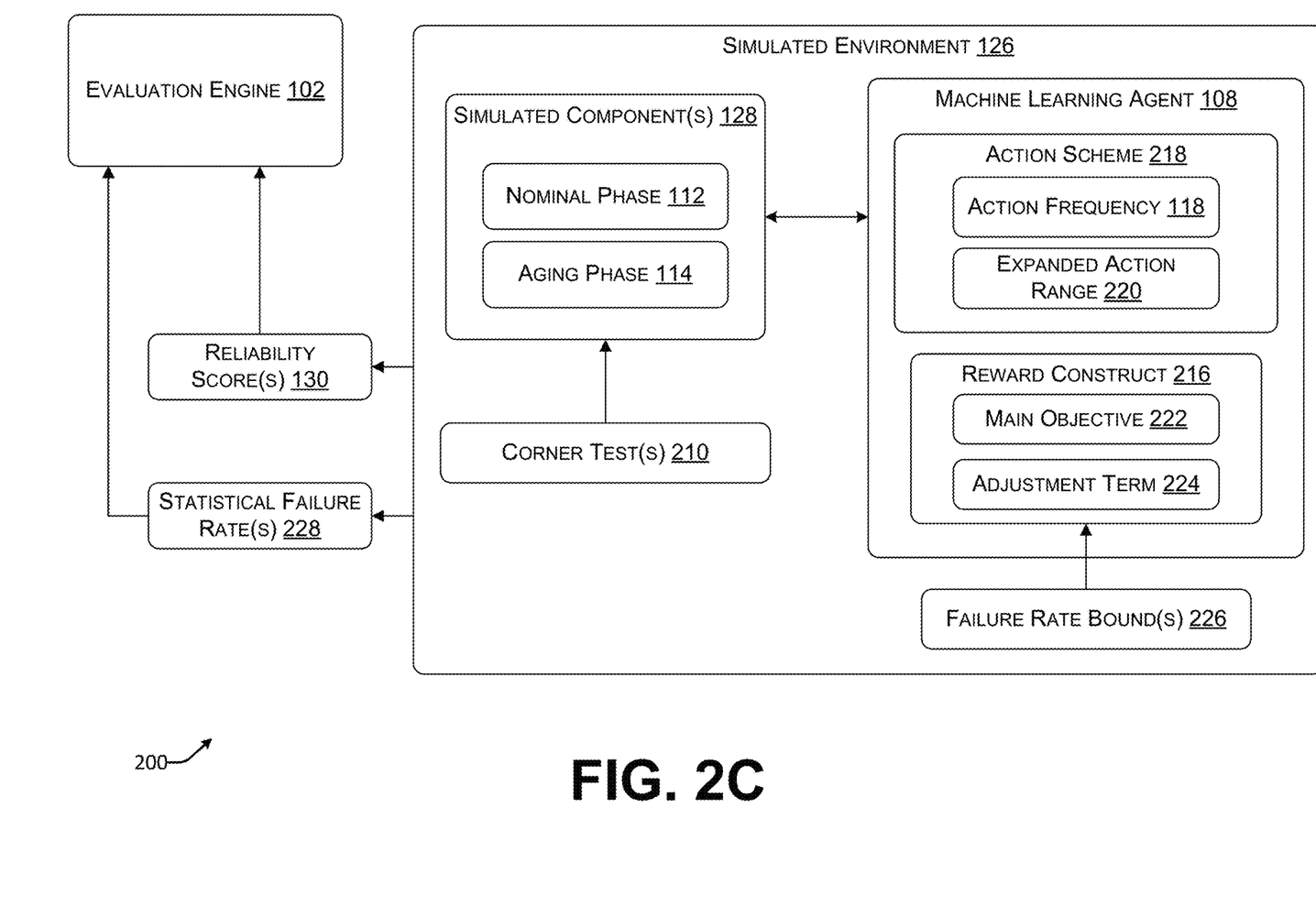
FIG. 2C illustrates the system for performing accelerated testing to measure long-term reliability of machine learning agents in a first stage of operation.

In various examples, the machine learning agent 108 can additionally be configured with a reward construct 216 that can quantify the success of various action schemes 218 comprising the action frequency 118 and an expanded action range 220 comprising the action range 120 modified by the acceleration factors 124. For example, the reward construct 216 can include a main objective 222 such as maximizing the efficiency of the climate control system 202. The main objective 222 can be augmented by an adjustment term 224 that captures one or more of the stress parameters and/or the acceleration factors discussed above. The adjustment term 224 can be a mathematical function of the stress parameters 212 and/or the acceleration factors 124. Accordingly, the reward construct 216 can be expressed using the following equation:

$$R = \text{Maximize(objective)} \pm f(P, AF_P)$$

Where P is one or more stress parameters 212 and $AF_P$ is an acceleration factor 124 corresponding to the one or more stress parameters 212. In this way, the machine learning agent 108 can quantitatively express the results of the accelerated test procedure 122 as executed within the simulated environment 126. In addition, the reward construct 216 can be constrained using failure rate bounds 226. In a specific example, if R as calculated using the above equation falls below a threshold failure rate defined by the failure rate bounds 226, the associated corner test 210 may be considered a failure. In another example, a plurality of instances of the machine learning agent 108 can be evaluated using the accelerated test procedure 122 to obtain a statistical failure rate 228. The statistical failure rate 228 can be compared to a quoted failure rate from the product specification 104. This comparison can be used to determine a difference in quoted and tested failure rate for warranty purposes, support, and other contexts. As discussed above, the evaluation engine 102 can also extract a reliability score 130 to quantify the long-term reliability of the machine learning agent 108.

Figure 3:
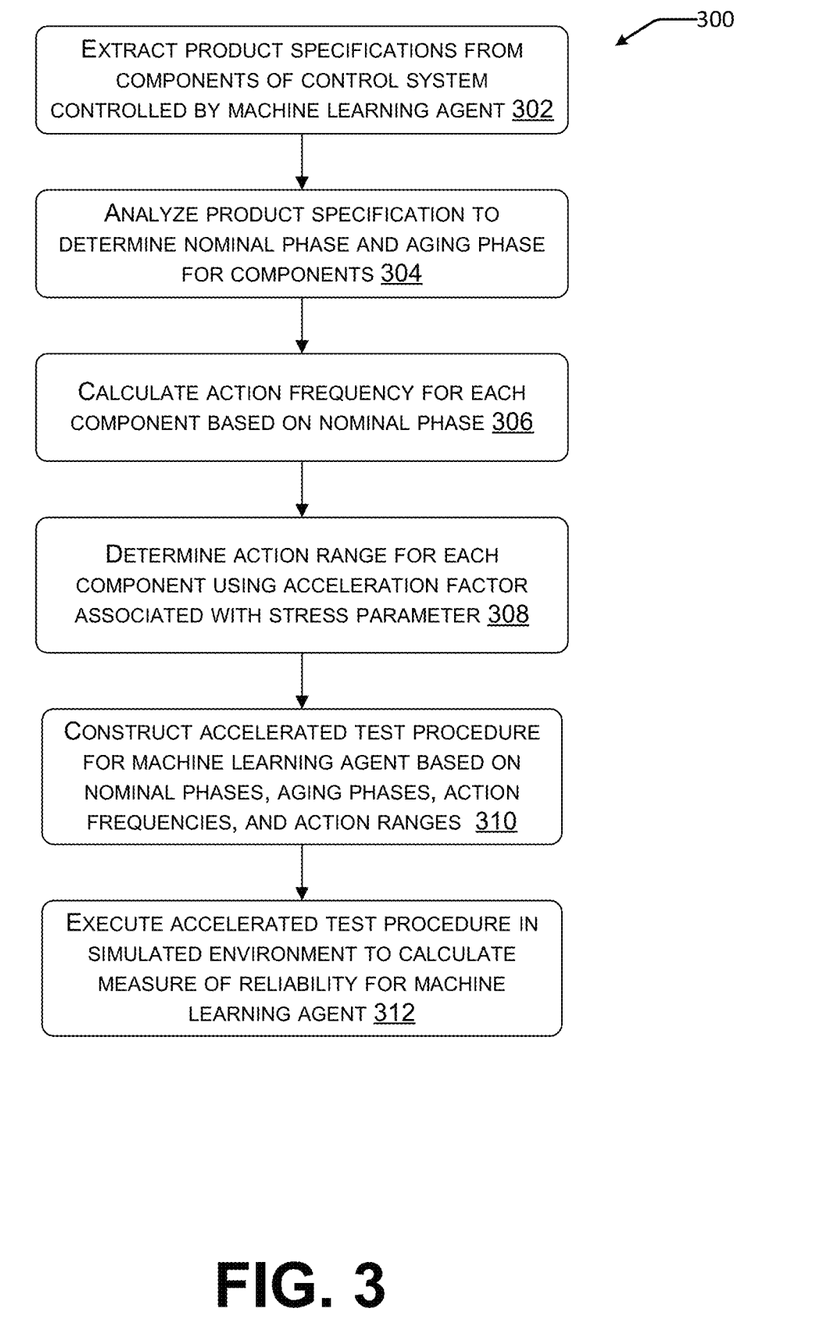
FIG. 3 is a flow diagram showing aspects of a routine for performing accelerated testing to measure long-term reliability of machine learning agents.

Turning now to FIG. 3, aspects of a routine 300 for enabling evaluation of long-term reliability for machine learning agents are shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 300 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 300 may be also implemented in many other ways. For example, the routine 300 may be implemented, at least in part, by a processor of another remote computer or a local circuit. In addition, one or more of the operations of the routine 300 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

With reference to FIG. 3, the routine 300 begins at operation 302 where a system extracts a plurality of product specifications from a corresponding plurality of components of a control system. As discussed above, the product specifications can define various durability metrics for a component such as power-on hours, power-on cycles, a projected failure rate for a predetermined time period, and so forth. The product specifications can be extracted by an evaluation engine. In addition, product specifications can be extracted for some or all of the components of the control system.

Next, at operation 304, the product specifications are analyzed to determine a nominal phase and an aging phase for the corresponding component. The nominal phase can define a period of time in which the component experiences a consistent and/or minimal failure rate. In contrast, the aging phase can define a period of time in which the component experiences an increasing failure rate. Furthermore, the system can also determine an initialization phase in which the component experiences an initially high but decreasing failure rate.

Then, at operation 306, the system calculates an action frequency for each component based on the associated nominal phase. As mentioned above, this enables the system to select action frequencies that conform to the physical constraints of the component.

Subsequently, at operation 308, the system determines can action range for each component using an acceleration factor that is associated with a stress parameter of the component. For instance, an electrical device may have a voltage stress parameter. As such, the acceleration factor will relate to voltage. The acceleration factor enables the system to expand the action range for a component to perform stress testing of the machine learning agent.

Then, at operation 310, the system constructs an accelerated test procedure for the machine learning agent based on the nominal phases, the aging phases, the action frequencies, and the action ranges of the components.

Finally, at operation 312, the accelerated test procedure is executed in a simulated that includes the machine learning agent and a set of simulated components that correspond to the components of the control system. From the accelerated test procedure, the system can calculate a measure of reliability for the machine learning agent. As mentioned above, the measure of reliability can be a numerical reliability score or other method of expressing the long-term reliability of the machine learning agent.

Figure 4:
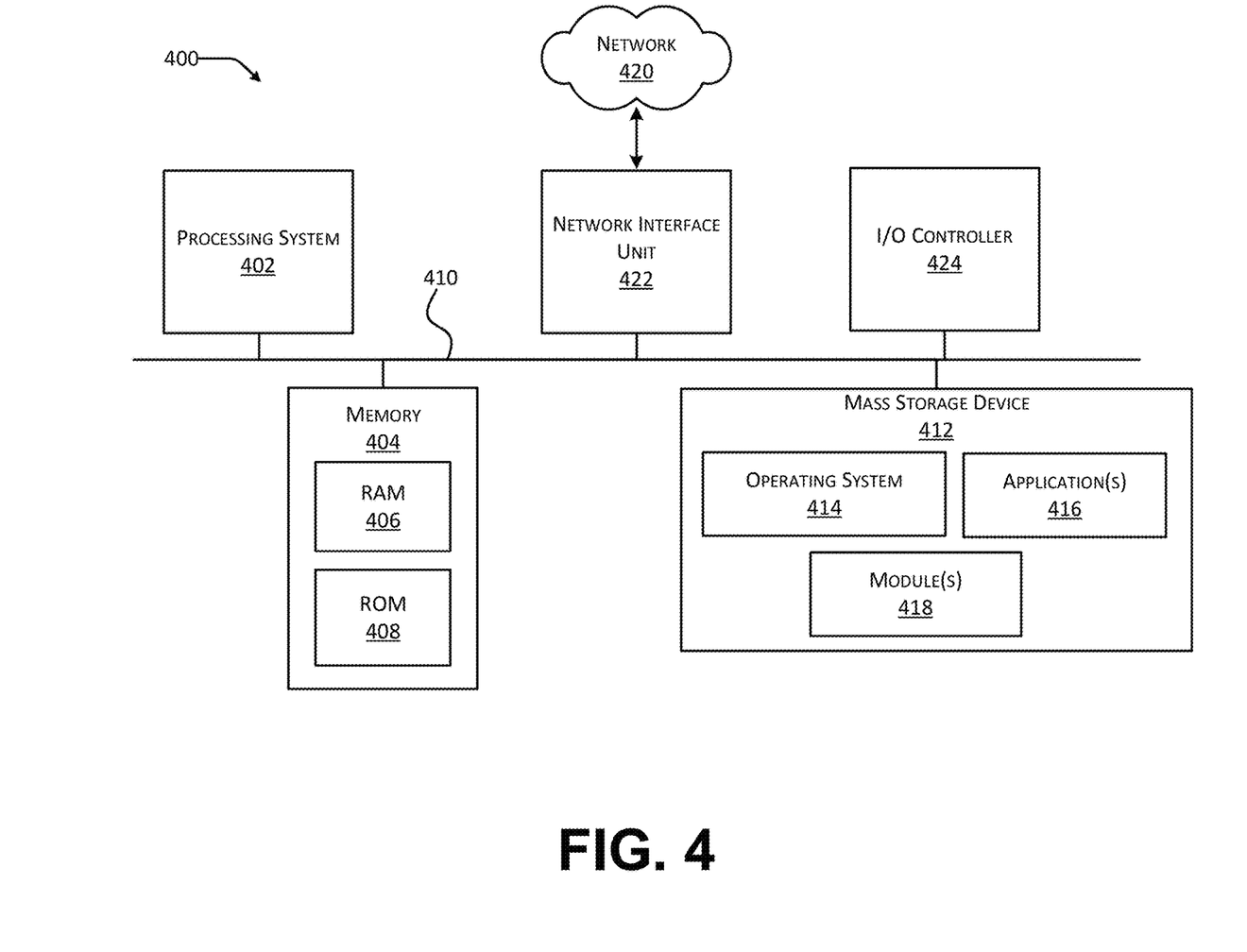
FIG. 4 is a computer architecture diagram illustrating an illustrative computer hardware and software architecture for a computing system capable of implementing aspects of the techniques and technologies presented herein.

FIG. 4 shows additional details of an example computer architecture 400 for a device, such as a computer or a server configured as part of the cloud-based platform or system 100, capable of executing computer instructions (e.g., a module or a program component described herein). The computer architecture 400 illustrated in FIG. 4 includes processing unit(s) 402, a system memory 404, including a random-access memory 406 (RAM) and a read-only memory (ROM) 408, and a system bus 410 that couples the memory 404 to the processing unit(s) 402. The processing units 402 may also comprise or be part of a processing system. In various examples, the processing units 402 of the processing system are distributed. Stated another way, one processing unit 402 of the processing system may be located in a first location (e.g., a rack within a datacenter) while another processing unit 402 of the processing system is located in a second location separate from the first location.

Processing unit(s), such as processing unit(s) 402, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 400, such as during startup, is stored in the ROM 408. The computer architecture 400 further includes a mass storage device 412 for storing an operating system 414, application(s) 416, modules 418, and other data described herein.

The mass storage device 412 is connected to processing unit(s) 402 through a mass storage controller connected to the bus 410. The mass storage device 412 and its associated computer-readable media provide non-volatile storage for the computer architecture 400. Although the description of computer-readable media contained herein refers to a mass storage device, it should be appreciated by those skilled in the art that computer-readable media can be any available computer-readable storage media or communication media that can be accessed by the computer architecture 400.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 400 may operate in a networked environment using logical connections to remote computers through the network 420. The computer architecture 400 may connect to the network 420 through a network interface unit 422 connected to the bus 410. The computer architecture 400 also may include an input/output controller 424 for receiving and processing input from a number of other devices, including a keyboard, mouse, touch, or electronic stylus or pen. Similarly, the input/output controller 424 may provide output to a display screen, a printer, or other type of output device.

It should be appreciated that the software components described herein may, when loaded into the processing unit(s) 402 and executed, transform the processing unit(s) 402 and the overall computer architecture 400 from a general-purpose computing system into a special-purpose computing system customized to facilitate the functionality presented herein. The processing unit(s) 402 may be constructed from any number of transistors or other discrete circuit elements, which may individually or collectively assume any number of states. More specifically, the processing unit(s) 402 may operate as a finite-state machine, in response to executable instructions contained within the software modules disclosed herein. These computer-executable instructions may transform the processing unit(s) 402 by specifying how the processing unit(s) 402 transition between states, thereby transforming the transistors or other discrete hardware elements constituting the processing unit(s) 402.

Figure 5:
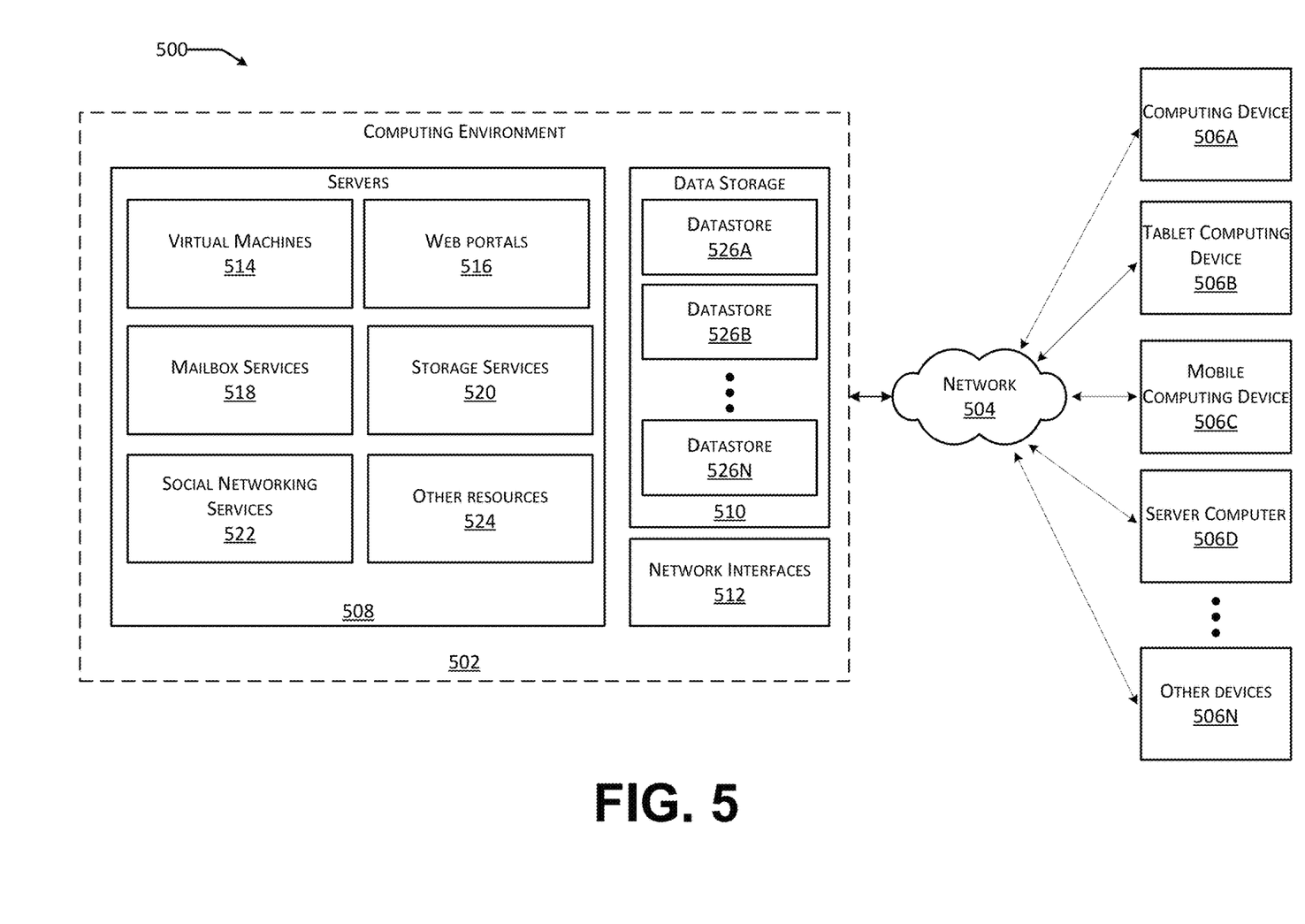
FIG. 5 is a diagram illustrating a distributed computing environment capable of implementing aspects of the techniques and technologies presented herein.

FIG. 5 depicts an illustrative distributed computing environment 500 capable of executing the software components described herein. Thus, the distributed computing environment 500 illustrated in FIG. 5 can be utilized to execute any aspects of the software components presented herein. For example, the distributed computing environment 500 can be utilized to execute aspects of the software components described herein.

Accordingly, the distributed computing environment 500 can include a computing environment 502 operating on, in communication with, or as part of the network 504. The network 504 can include various access networks. One or more client devices 506A-506N (hereinafter referred to collectively and/or generically as "computing devices 506") can communicate with the computing environment 502 via the network 504. In one illustrated configuration, the computing devices 506 include a computing device 506A such as a laptop computer, a desktop computer, or other computing device; a slate or tablet computing device ("tablet computing device") 506B; a mobile computing device 506C such as a mobile telephone, a smart phone, or other mobile computing device; a server computer 506D; and/or other devices 506N. It should be understood that any number of computing devices 506 can communicate with the computing environment 502.

In various examples, the computing environment 502 includes servers 508, data storage 510, and one or more network interfaces 512. The servers 508 can host various services, virtual machines, portals, and/or other resources. In the illustrated configuration, the servers 508 host virtual machines 514, Web portals 516, mailbox services 518, storage services 520, and/or social networking services 522. As shown in FIG. 5 the servers 508 also can host other services, applications, portals, and/or other resources ("other resources") 524.

As mentioned above, the computing environment 502 can include the data storage 510. According to various implementations, the functionality of the data storage 510 is provided by one or more databases operating on, or in communication with, the network 504. The functionality of the data storage 510 also can be provided by one or more servers configured to host data for the computing environment 500. The data storage 510 can include, host, or provide one or more real or virtual datastores 526A-526N (hereinafter referred to collectively and/or generically as "datastores 526"). The datastores 526 are configured to host data used or created by the servers 508 and/or other data. That is, the datastores 526 also can host or store web page documents, word documents, presentation documents, data structures, algorithms for execution by a recommendation engine, and/or other data utilized by any application program. Aspects of the datastores 526 may be associated with a service for storing files.

The computing environment 502 can communicate with, or be accessed by, the network interfaces 512. The network interfaces 512 can include various types of network hardware and software for supporting communications between two or more computing devices including the computing devices and the servers. It should be appreciated that the network interfaces 512 also may be utilized to connect to other types of networks and/or computer systems.

It should be understood that the distributed computing environment 500 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 500 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 500 to utilize the functionality described herein for providing the techniques disclosed herein, among other aspects.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different control systems).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method comprising:
   extracting a plurality of product specifications from a plurality of components within a physical control system controlled by a machine learning agent;
   determining a nominal phase defining a time period of a consistent failure rate and an aging phase defining a time period of an increasing failure rate for each component of the plurality of components based on the plurality of product specifications;
   calculating an action frequency for each component of the plurality of components based on the associated nominal phase, the action frequency defining a frequency at which the machine learning agent can actuate each component;
   determining an action range for each component of the plurality of components using one or more acceleration factors associated with a stress parameter of the component, the action range defining a range of values configurable by the machine learning agent for each component;
   constructing an accelerated test procedure for determining a reliability of the machine learning agent based on the nominal phases, the aging phases, the action frequencies, and the action ranges of the plurality of components;
   executing the accelerated test procedure within a simulated environment comprising the machine learning agent and a plurality of simulated components that correspond to the plurality of components to calculate a reliability score quantifying a failure rate of the machine learning agent with respect to the plurality of simulated components;
   training the machine learning agent, based on the reliability score, to learn a configuration of the physical control system that maximizes the reliability score by iteratively repeating the accelerated test procedure; and
   deploying machine learning agent to the plurality of components of the physical control system to implement the configuration of the control system that maximizes the reliability score in accordance with the nominal phases, the aging phases, the action frequencies, and the actions ranges of the accelerated test procedure.

2. The method of claim 1, wherein the nominal phase comprises a number of operational hours and a number of power cycles calculated by an offline model based on the product specifications.

3. The method of claim 1, wherein the aging phase comprises a failure probability calculated using a statistical probability distribution based on the product specifications.

4. The method of claim 1, wherein the plurality of components are mechanical components, and the stress parameter is mechanical stress.

5. The method of claim 1, wherein the plurality of components are electrical components, and the stress parameter is voltage.

6. The method of claim 1, wherein the accelerated test procedure comprises a plurality of corner tests, each corner test defining a sequence of steps for evaluating the machine learning agent under an associated load condition.

7. The method of claim 1, wherein a maximum action frequency is equal to a power cycle frequency of the plurality of components.

8. A system comprising:
   one or more processing units; and
   a computer-readable medium having encoded thereon computer-readable instructions that when executed by the one or more processing units cause the system to:
   extract a plurality of product specifications from a plurality of components within a physical control system controlled by a machine learning agent;
   determine a nominal phase defining a time period of a consistent failure rate and an aging phase defining a time period of an increasing failure rate for each component of the plurality of components based on the plurality of product specifications;
   calculate an action frequency for each component of the plurality of components based on the associated nominal phase, the action frequency defining a frequency at which the machine learning agent can actuate each component;
   determine an action range for each component of the plurality of components using one or more acceleration factors associated with a stress parameter of the component, the action range defining a range of values configurable by the machine learning agent for each component;
   construct an accelerated test procedure for determining a reliability of the machine learning agent based on the nominal phases, the aging phases, the action frequencies, and the action ranges of the plurality of components;

execute the accelerated test procedure within a simulated environment comprising the machine learning agent and a plurality of simulated components that correspond to the plurality of components to calculate a measure of reliability for the machine learning agent reliability score quantifying a failure rate of the machine learning agent with respect to the plurality of simulated components;

train the machine learning agent, based on the reliability score, to learn a configuration of the physical control system that maximizes the reliability score by iteratively repeating the accelerated test procedure; and deploy machine learning agent to the plurality of components of the physical control system to implement the configuration of the control system that maximizes the reliability score in accordance with the nominal phases, the aging phases, the action frequencies, and the actions ranges of the accelerated test procedure.

9. The system of claim 8, wherein the nominal phase comprises a number of operational hours and a number of power cycles calculated by an offline model based on the product specifications.

10. The system of claim 8, wherein the aging phase comprises a failure probability calculated using a statistical probability distribution based on the product specifications.

11. The system of claim 8, wherein the plurality of components are mechanical components, and the stress parameter is mechanical stress.

12. The system of claim 8, wherein the plurality of components are electrical components, and the stress parameter is voltage.

13. The system of claim 8, wherein the accelerated test procedure comprises a plurality of corner tests, each corner test defining a sequence of steps for evaluating the machine learning agent under an associated load condition.

14. The system of claim 8, wherein a maximum action frequency is equal to a power cycle frequency of the plurality of components.

15. A computer-readable storage medium having encoded thereon computer-readable instructions that when executed by a system cause the system to:

extract a plurality of product specifications from a plurality of components within a physical control system controlled by a machine learning agent;

determine a nominal phase defining a time period of a consistent failure rate and an aging phase defining a time period of an increasing failure rate for each component of the plurality of components based on the plurality of product specifications;

calculate an action frequency for each component of the plurality of components based on the associated nominal phase, the action frequency defining a frequency at which the machine learning agent can actuate each component;

determine an action range for each component of the plurality of components using one or more acceleration factors associated with a stress parameter of the component, the action range defining a range of values configurable by the machine learning agent for each component;

construct an accelerated test procedure for determining a reliability of the machine learning agent based on the nominal phases, the aging phases, the action frequencies, and the action ranges of the plurality of components;

execute the accelerated test procedure within a simulated environment comprising the machine learning agent and a plurality of simulated components that correspond to the plurality of components to calculate a measure of reliability for the machine learning agent reliability score quantifying a failure rate of the machine learning agent with respect to the plurality of simulated components;

train the machine learning agent, based on the reliability score, to learn a configuration of the physical control system that maximizes the reliability score by iteratively repeating the accelerated test procedure; and deploy machine learning agent to the plurality of components of the physical control system to implement the configuration of the control system that maximizes the reliability score in accordance with the nominal phases, the aging phases, the action frequencies, and the actions ranges of the accelerated test procedure.

16. The computer-readable storage medium of claim 15, wherein the nominal phase comprises a number of operational hours and a number of power cycles calculated by an offline model based on the product specifications.

17. The computer-readable storage medium of claim 15, wherein the aging phase comprises a failure probability calculated using a statistical probability distribution based on the product specifications.

18. The computer-readable storage medium of claim 15, wherein a maximum action frequency is equal to a power cycle frequency of the plurality of components.

19. The system computer-readable storage medium of claim 15, wherein the plurality of components are electrical components, and the stress parameter is voltage.

20. The system of claim 8, wherein the accelerated test procedure comprises a plurality of corner tests, each corner test defining a sequence of steps for evaluating the machine learning agent under an associated load condition.

* * * * *